Dec. 9, 1969    J. J. VILLIERS    3,483,560
RADIO NAVIGATION SYSTEM HAVING AUTOMATIC ERROR COMPENSATION
Filed June 27, 1968    3 Sheets-Sheet 1

INVENTOR:
JACQUES J. VILLIERS
By A. A. Saffitz
ATTORNEY

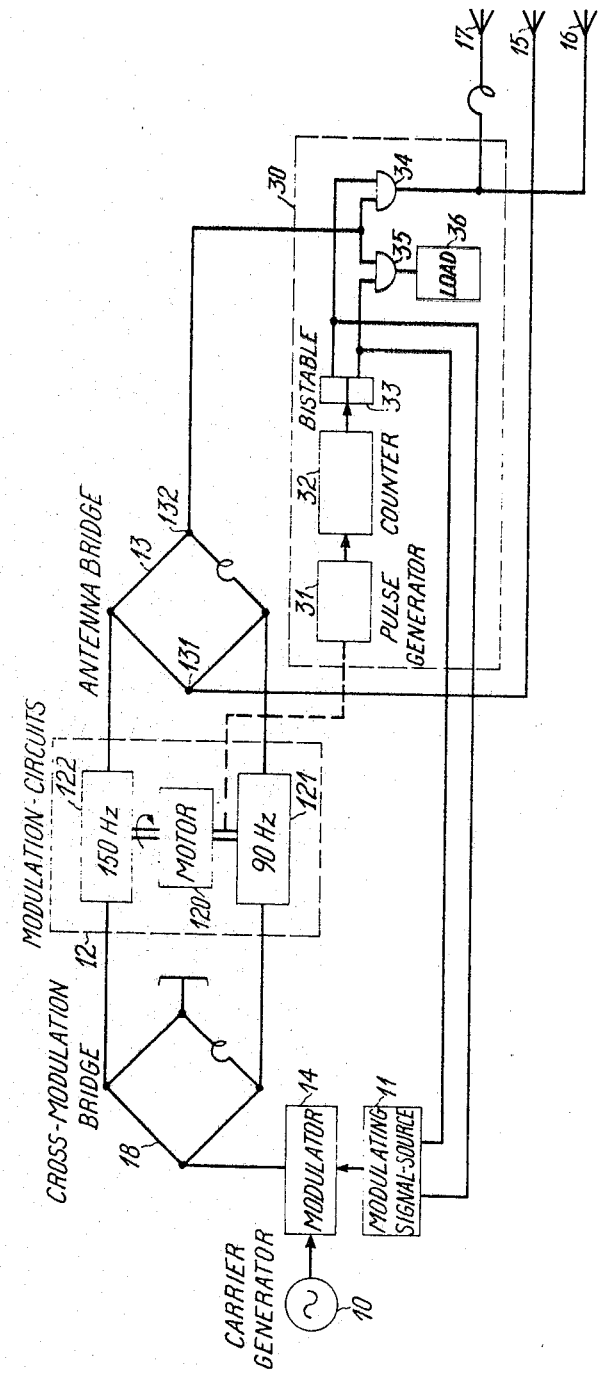

United States Patent Office 3,483,560
Patented Dec. 9, 1969

3,483,560
RADIO NAVIGATION SYSTEM HAVING
AUTOMATIC ERROR COMPENSATION
Jacques J. Villiers, Orly-Aerogare, France, assignor to Centre National de la Recherche Scientifique, Paris, France, a body corporate of France
Filed June 27, 1968, Ser. No. 740,500
Claims priority, application France, June 29, 1967, 112,491
Int. Cl. G01s 1/16, 1/18
U.S. Cl. 343—108     3 Claims

ABSTRACT OF THE DISCLOSURE

Improvement to the instrument landing systems comprising a ground transmitter including a generator of a radio-frequency signal amplitude-modulated by two basic audio-frequency signals with equal modulation degrees, a central antenna fed by said radio-frequency signal and two lateral antennas fed by the side bands of said radio-frequency signal, and an aircraft receiver including two demodulators of said basic audio-frequency signals and an output meter differentially fed by the audio-frequency signals. According to the improvement, the ground transmitter further comprises a transmitter switching unit and a load, said transmitter switching unit sequentially feeding at a low frequency the two lateral antennas and the load with the radio-frequency side band signals and the aircraft receiver further comprises a receiver switching unit, means for controlling said receiver switching unit in synchronism with the transmitter switching unit, said receiver switching unit differentially connecting said demodulators to said output meter sequentially in one and the opposite directions.

---

This invention relates to a radio navigation system having automatic error compensation of use in all radio beam systems defining a direction by equality between two modulation degrees, the system having more particularly the possibility of adaptation to existing landing aids systems to improve the safety and accuracy thereof.

The system for guiding aircraft by radio towards runways in conditions of bad visibility, which is known as the Instrument Landing System (I.L.S.) and which is fitted at the main airports of the world comprises a runway alignment beam, known as a localizer, a beam for providing descent guidance, known as a glide path, and three markers. The localizer and the glide path transmitter each transmit a carrier, at a very-high frequency (VHF) and at an ultra-high frequency (UHF) respectively, and the respective carriers are modulated by a 90 Hz. audio-frequency modulation and by a 150 Hz. audio-frequency modulation; the modulation degrees or depths vary, in the case of the localizer, in dependence upon the bearing on either side of the runway center-line and, in the case of the glide path system, in dependence upon whether the aircraft is above or below the line of descent, each of these lines being defined by equality between the two modulation depths. Accordingly, each of these radio beam systems—i.e., the localizer and the glide path equipments—comprises a central antenna, which receives the carrier modulated at the two audio-frequencies with equal modulation degrees, and an array of lateral antennas having a symmetrical radiation pattern on either side of the guidance path with zero field thereon, such network being fed by side bands of the audio-frequency modulated carrier with a 180° phase shift from one another. The aircraft equipment comprises three separate receivers—one for each radio beam system and one for the markers. Each beam receiver detects, filters and rectifies the two audio-frequency components and compares them in a balanced center-zero measuring instrument which gives indications proportional to the difference between the two modulation depths. ICAO (the International Civil Aviation Organization) has standardized the characteristics of I.L.S. transmitting and receiving facilities. More particularly, localizer beam width—i.e., that angular displacement of a moving station intersecting the runway center-line for which the indications of the bearing-measuring instrument shift from one end of the scale thereof to the other—is determined in dependence upon runway length at e.g. 5°.

This system, although capable of guiding aircraft to near a landing runway in conditions of reduced visibility may not be safe and accurate enough for landings in conditions of zero visibility, due to errors in setting the guiding lines, more particularly directionwise, calibration errors and drift of the aircraft and monitoring receivers, interfering reflections from stationary and moving obstacles, and almost unforeseeable and very difficultly detectable disturbances due to interference by distant transmissions in conditions of abnormal propagation.

It is the object of the invention to obviate these sources of error so that aircraft can be guided more safely and accurately than heretofore, more particularly with the aim of guiding them right on to the ground.

According to the invention, on the assumption that a guiding plane is defined by equality between the depths of two audio-frequency modulations of a single carrier and the angular deviation in relation to such plane is defined by a difference between such modulation depths, such difference being produced by a directional pattern transmission of side bands of the audio-frequency modulations, such directional pattern transmission is alternately switched on and off by a very-low-frequency switching unit so that a moving station near such plane receives alternately at the switching frequency, on the one hand, a first signal having between the low-frequency modulation depths a difference corresponding to the displacement of such station from the guiding plane, such signal containing sundry errors, and, on the other hand, a second reference signal containing substantially the same errors. These two signals are applied successively to the indicator of the aircraft receiver at the switching frequency and accordingly the errors are eliminated. To achieve the synchronous switching of the aircraft receiver, the I.L.S. transmitter is alternately modulated by one or other of two signals characteristic of the state of switching, and the aircraft receiver has added to it a condition detector which is sensitive to the latter signals and which controls a trigger-like facility which changes over the connections between the receiver output and the load—i.e., an indicator or an automatic pilot.

The system according to the invention is compatible for use with existing I.L.S. localizers and can therefore be used without modification or previous handling in all aircraft having standard I.L.S. receiving equipment. To this end, the switching frequency is so selected that the periodic variations produced thereby at the output of standard I.L.S. receivers are cut-off by the filtering thereof, so that the receiver output current is halved for a given angular offset from a guide-line; to compensate for this, the radiation diagram of the localizer is altered to double the variation in the difference between modulation depths in dependence upon angular offsets from the guidance plane.

The invention will be better understood from the following description and the accompanying drawings wherein:

FIG. 3 is a basic diagram for a localizer according to the invention;

Figure 1:
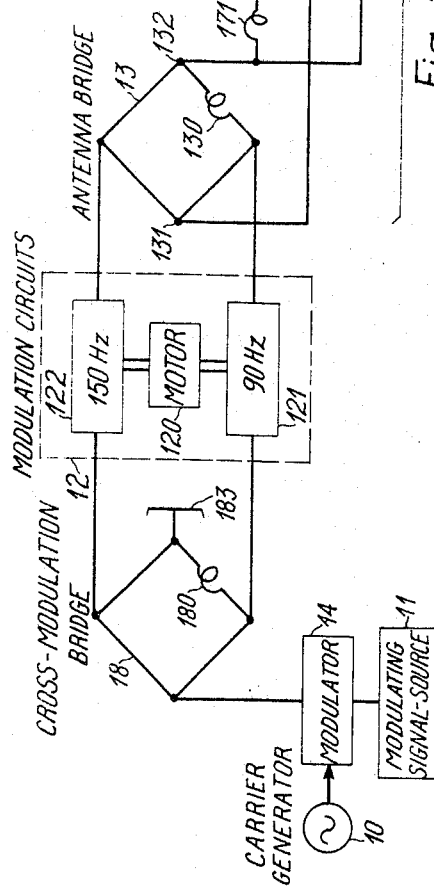
FIG. 1 is a block diagram of a prior art localizer.

FIG. 1 is a very diagrammatic view of a prior art I.L.S. localizer. The same comprises a carrier generator 10 producing a very-high frequency carrier, and optionally a source of modulating signal 11 and a modulator 14 allowing the carrier to be modulated by an extra modulating signal, if it is desired to use the carrier wave from 10 to transmit any further information to the aircraft. A mechanical modulator 12 comprises a common motor 120 and two modulation circuits 121, 122 at whose outputs the carrier appears modulated at 90 Hz. and 150 Hz. respectively. An antenna bridge 13 receives the two signals produced by the mechanical modulator and mixes them in two independent outputs 131, 132; output 131 is connected to the central antenna 15 and output 132 is connected to both lateral antennas 16 and 17. A warning facility comprises a field detector 21 with a dipole antenna 20 disposed on the theoretical axis of the localizer and a monitor circuit 22 which gives a warning immediately after the marked axis deviates by more than a predetermined angle from its due position. The modulator 14 is connected to the two modulation circuits 121, 122 by a cross-modulation bridge 18 preventing interference between the various modulated signals. Bridge 18 comprises four equal lengths of line, one of which introduces a 180° phase shift by a crossing of its two conductors, symbolized by a loop 180 on the single-wire illustration in FIG. 1. Bridge 18 is balanced by a reactive impedance load 183 which is connected to the bridge terminal diagonally opposite the bridge terminal connected in the output of modulator 14. The antenna bridge 13 is similar to the cross-modulation bridge 18. The output terminal 131 supplies the central antenna 15 with the carrier having both the 90 and the 150 Hz. modulation, while the terminal 132 supplies the lateral antennas 16, 17 with the 90 Hz. and 150 Hz. side band components at a 180° phase shift from one another, this feature being symbolized by the phase-shifting loop 130 in one of the bridge arms leading to the terminal 132. To energize the antennas 16, 17 in phase opposition, on the assumption that the cables connecting them to the terminal 132 are of the same electrical length, the supply conductors for one of them are crossed over as symbolized by the reference 171.

As it is well known from those skilled in the art, the central antenna is fed by the signal $$A \sin 2\pi ft \ [1 + m \sin 2\pi 90t + m \sin 2\pi 150t]$$

and the two lateral antennas are fed by the signal:

$$Am \sin 2\pi ft \ [\sin 2\pi 90t - \sin 2\pi 150t]$$

where A is the amplitude of the signals, $m$ the degree or depth of modulation, $f$ the carrier frequency and $t$ the time.

Figure 4:
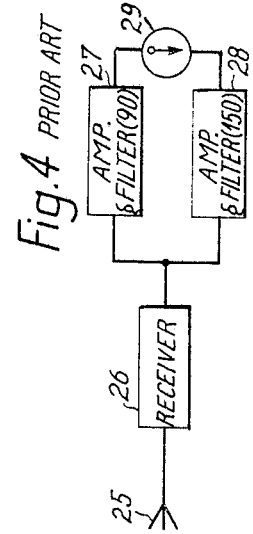
FIG. 4 is a block diagram of a standard aircraft receiver for use with a prior art localizer.

FIG. 4 is a very diagrammatic view of standard aircraft equipment for use with a conventional localizer of the kind shown in FIG. 1. The equipment comprises an antenna 25 and a receiver 26 delivering to two amplifiers 27, 28 in parallel with one another, amplifier 27 having a 90 Hz. filter and amplifier 28 having a 150 Hz. filter. The voltage outputs of these two channels are applied differentially to the terminals of an indicator or meter 29 whose pointer deflects, in proportion to the difference between the two modulation degrees, to the right or left-hand in response to movements of the aircraft to the left or right away from the guidance path.

Figure 2:
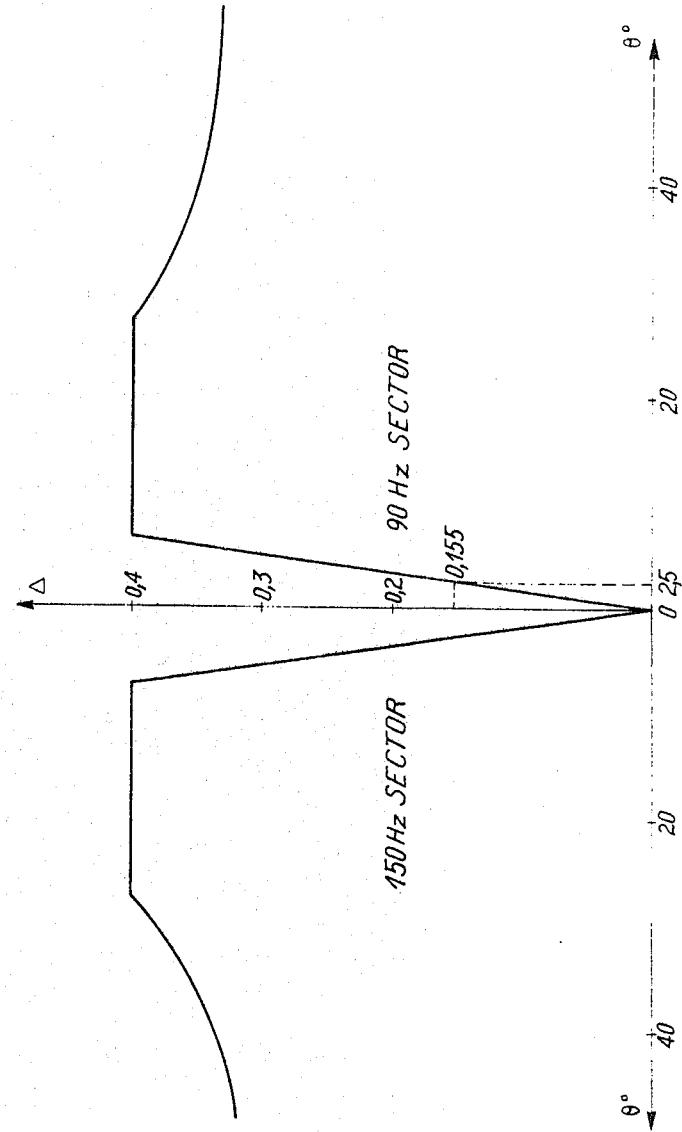
FIG. 2 is an explanatory diagram.

FIG. 2 shows for one exemplary case the difference $\Delta$ between the 90 Hz. and 150 Hz. modulation degrees of an assumedly correctly set-up localizer of the kind shown in FIG. 1 for a deviation angle $\theta$ on either side of the guidance path, the modulation depth $m$ of each modulator 121, 122 being 20%. Clearly, the difference $\Delta$, which reaches its maximum $2m=0.4$ at a $\theta$ less than 10° and stays there up to about 30° from the runway centerline, is almost 0.155 for $\theta=2.5°$. ICAO specified that a 15.5% difference between the modulation degrees should produce at the aircraft receiver output 0.150 milliampere of D.C., giving maximum deflection of the pointer of the indicator 29. By displacing a receiver transversally to the landing strip, it is easy to check the beam width. In the case of FIG. 2 the beam width is 5°. The monitor 22 operates similarly to the aircraft receiver.

In a system of this kind, the aircraft receiver output current $i$ corresponding to a given angular separation from the nominal path is in actual fact increased by error currents $\epsilon_1$ to $\epsilon_5$ from the following sources:

$\epsilon_1$, representing the centering error of the localizer center-line due to wrong sitting or wrong energization of the side band antennas;

$\epsilon_2$, representing inequality as between the 90 and 150 Hz. modulation depth of the central-antenna signal;

$\epsilon_3$, representing reflections of side band antenna signals on stationary or moving obstacles;

$\epsilon_4$, representing centering error of the aircraft receiver due to miscalibration, a change of calibration in time, or the presence of harmonics in the localizer modulations;

$\epsilon_5$, representing interference by distant transmissions due to abnormal propagation.

The monitor the function of which is to measure $\epsilon_1$ also experiences the other sources of errors.

FIG. 3 shows the localizer of FIG. 1 modified in accordance with the invention.

First, the lateral antenna or the lateral antenna arrays are devised to double the modulation depth per degree of separation from the guidance path. By virtue of this doubling of modulation depth, an angular spacing of 2.5° instead of corresponding as formerly to a difference of modulation depths of 0.155, i.e. to a current of 0.150 ma. will now correspond to a difference of modulation depths of 0.31, i.e. to a current of 0.3 ma.

A switching and balancing circuit 30 controlled either electronically, but output 131 of bridge 13, or—and preferably—mechanically, by motor 120 of the mechanical modulator 12, is added between output 132 of antenna bridge 13 and the antennas 16, 17. The circuit or facility 30 comprises a pulse generator 31, a counter 32, a bistable 33, and two AND-gates 34, 35 controlled by the one and zero outputs of the bistable 33 respectively, the output signal from the terminal 132 going through the AND-gates 34, 35 alternately to the antennas 16, 17 (via AND-gate 34) and to a balancing load 36 (via AND-gate 35) having the same impedance as the antennas 16, 17. The pulse generator 31, whether controlled by output 131 of bridge 13, where the carrier modulated at both 90 Hz. and 150 Hz. appears, or whether modulated mechanically by the motor 120 controlling these two modulations, delivers one or more stepping pulses every thirtieth of a second to the counter 32. The same transmits a switching pulse to the bistable 33 whenever it has received the number of pulses corresponding to half the particular switching time selected, for instance, every three thirtieth-of-a-second pulse in the case of a 5 Hz. switching frequency. The two outputs of the device 33 are connected to two modulation signal inputs of the modulating signal circuit 11 to control modulator 14 alternately by two signals characteristic of the state of switching. For instance, a 750 Hz. modulation can be associated with the operative state of the device 33, in which state the AND-gate 34 is passing and the lateral antennas 16, 17 are energized, and a 1300 Hz. modulation can be associated with the normal or inoperative state of the device 33, in which state the AND-gate 34 is closed and the antennas 16, 17 are deenergized.

Figure 5:
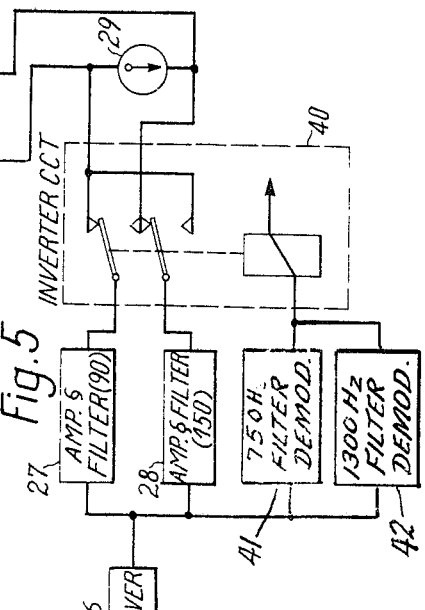
FIG. 5 is a diagram of an aircraft receiver modified according to the invention for use with a localizer of the kind shown in FIG. 3.

FIG. 5 is a diagrammatic view of an aircraft equipment modified in accordance with the invention by the interposition, between the outputs of the filtering amplifiers 27, 28 and the terminals of the differential meter 29, of a changeover switch 40 controlled by a state detector connected to the output of the receiver 26 in parallel to the filter-amplifiers 27, 28. This state detector comprises two filters and detectors 41 and 42 respectively filtering and demodulating one and the other of the above-mentioned characterizing frequencies (750 Hz. and 1300 Hz.), and means for applying a rectified current having either of two possible values (according to which of the latter frequencies is present) to a further device 40. The device 40, which can be a polarized relay or a bistable operating a set of gates, connects when in its normal position the outputs of the amplifiers 27, 28 to the input of the indicator 29 in the direction corresponding to the standard rules and regulations, whereas when in the operative position, in which position the device 40 is placed and held by the signal characteristic of lateral antennae disconnection, for instance, the 1300 Hz. modulation of the I.L.S. signal, the device 40 connects the outputs of the amplifiers 27, 28 to the terminals of the indicator 29 the opposite way round. Consequently, the modified equipment shown in FIG. 5 makes it possible to use a conventional localizer of the kind shown in FIG. 1 without modification or previous handling.

The guidance path supervisory and warning facility, known as a monitor, which was not shown in FIG. 3 although associated with the differential localizer according to the invention as with conventional localizers, is modified in the same way as the aircraft equipment shown in FIG. 5.

In the differential I.L.S. system thus provided, the current at the output of the aircraft receiver 26 is as follows:

(a) $\qquad 2i + \epsilon_1 + \epsilon_2 + \epsilon_3 + \epsilon_4 + \epsilon_5$ while the lateral antennas are energized; current $2i$ is detected instead of current $i$ in the conventional localizer since the ratio of the difference of modulation depths to the angular separation $\theta$ has been doubled.

(b) $\qquad \epsilon_2 + \epsilon_4 + \epsilon_5$ while the lateral antennas are not energized;

(c) $\qquad \frac{1}{2}(2i + \epsilon_1 + \epsilon_3) = i + \frac{\epsilon_1 + \epsilon_3}{2}$ at the output of the meter 29 which integrates the difference of the quantities expressed by the above-given formulas (a) and (b).

So far as the monitor is concerned the integrated current is reduced to $$\frac{\epsilon_1 + \epsilon_3}{2}$$

i.e., the result of its measurement of the beam offset is made independent of its own setting.

Since the errors $\epsilon_1$ due to offset of the localizer guidance path and $\epsilon_3$ due to interfering reflections both cancel when the lateral antennas are deenergized, doubling the modulation level difference for a given angular separation from the marked centerline, so that the current is $2i$ for half the time, is also an advantage for conventional receivers of the kind shown in FIG. 4 since $\epsilon_1$ and $\epsilon_3$ are divided by two.

In the I.L.S. above defined the signals from the I.L.S. transmitter are switched at a given low frequency and the received signals are synchronously switched in one or the opposite direction to the terminals of the aircraft measuring device. It is possible to improve the accuracy of the measuring device by short-circuiting at the output of the aircraft receiver all the signals which are not modulated at the switching frequency. This is done by a band stop filter 23 tuned at the switching frequency and connected in parallel with the meter 29 to the outputs of amplifiers-filters 27 and 28.

In the foregoing, FIGS. 3 and 5 represent the system of the invention in the case of one guidance plane, the localizer guidance plane for example. It is to be understood that the invention includes the case of the synchronous switching means being applied to two radio-electrically defined guidance planes, the localizer and the glide path of an I.L.S. for example. In that case it is not necessary that the switching frequency be the same in the localizer transmitter and the glide path transmitter.

What I claim is:

1. In a radio aircraft landing aid system comprising a ground transmitter including a generator of a radio-frequency singal amplitude-modulated by two basic audio-frequency signals with equal modulation degrees, a central antenna fed by said radio-frequency signal and two lateral antennas fed by the side bands of said radio-frequency signals, and an aircraft receiver including two demodulators of said basic audio-frequency signals and an output meter differentially fed by the audio-frequency signals, the improvement wherein the ground transmitter further comprises a transmitter switching unit and a load, said transmitter switching unit sequentially feeding at a low frequency the two lateral antennas and the load with the radio-frequency side band singals and the aircraft receiver further comprises a receiver switching unit, means for controlling said receiver switching unit in synchronism with the transmitter switching unit, said receiver switching unit differentially connecting said demodulators to said output meter sequentially in one and the opposite directions.

2. In a radio aircraft landing aid system, the improvement as set forth in claim 1, in which the means for controlling the receiver switching unit in synchronism with the transmitter switching unit comprises in the ground transmitter a modulator for modulating the radio-frequency signal amplitude-modulated by two basic audio-frequency signals with equal modulation degrees by two supplementary audio-frequency signals having frequencies different from the two basic audio-frequency signals in dependence on the state of the transmitter switching unit, and in the aircraft receiver two demodulators of said supplementary audio-frequency signals and means for controlling by said demoulated supplementary audio-frequency signals the receiver switching unit.

3. In a radio aircraft landing aid system, the improvement as set forth in claim 1, in which the two demodulators of the basic audio-frequency signals in the aircraft receiver are interconnected by a band-stop filter tuned at the low frequency of the transmitter and receiver switching units.

References Cited

UNITED STATES PATENTS

| | | | |
|---|---|---|---|
| 2,288,196 | 6/1942 | Kramer | 343—107 |
| 2,543,081 | 2/1951 | Watts et al. | 343—107 |
| 2,434,955 | 1/1948 | Pickles | 343—107 |
| 2,602,161 | 7/1952 | Proskauer | 343—107 |
| 3,275,599 | 9/1966 | Page | 343—107 |
| 3,351,941 | 11/1967 | Page | 343—107 |

RODNEY D. BENNETT, JR., Primary Examiner

H. C. WAMSLEY, Assistant Examiner

U.S. Cl. X.R.

343—109